(12) United States Patent
Kim et al.

(10) Patent No.: US 8,680,875 B2
(45) Date of Patent: Mar. 25, 2014

(54) SYSTEM AND METHOD FOR ANALYZING TIMING OF SEMICONDUCTOR CHIP

(75) Inventors: Byung-Su Kim, Seoul (KR); Hung Bok Choi, Yongin-si (KR); Bong Hyun Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 225 days.

(21) Appl. No.: 13/360,147

(22) Filed: Jan. 27, 2012

(65) Prior Publication Data

US 2012/0212239 A1    Aug. 23, 2012

(30) Foreign Application Priority Data

Feb. 18, 2011    (KY) .......................... 10-2011-0014738

(51) Int. Cl.
  *G01R 27/28*    (2006.01)
(52) U.S. Cl.
  USPC .......................................................... 324/617
(58) Field of Classification Search
  USPC ................... 324/617, 762.01–762.1; 257/48; 438/14–18
  See application file for complete search history.

(56) References Cited

U.S. PATENT DOCUMENTS

| 7,142,668 B1* | 11/2006 | Kogure .......................... 380/28 |
| 8,020,130 B2 | 9/2011 | Nagata |
| 8,093,918 B2* | 1/2012 | Okayasu et al. ........... 324/750.3 |
| 2007/0266356 A1 | 11/2007 | Chang et al. |
| 2009/0106720 A1 | 4/2009 | Nagata |

FOREIGN PATENT DOCUMENTS

| JP | 2008-226199 A | 9/2008 |
| JP | 2009-104225 A | 5/2009 |

* cited by examiner

*Primary Examiner* — Tung X Nguyen

(74) *Attorney, Agent, or Firm* — Harness, Dickey & Pierce, P.L.C.

(57) ABSTRACT

Example embodiments relate to a method performed by an apparatus for analyzing time of a semiconductor chip. The method may include defining a netlist, defining time delays of devices defined in the netlist, performing a normality test using the time delays, judging a p-value based on the normality test, and determining a time delay of the semiconductor chip.

20 Claims, 10 Drawing Sheets

SYSTEM AND METHOD FOR ANALYZING TIMING OF SEMICONDUCTOR CHIP

CROSS-REFERENCE TO RELATED APPLICATIONS

This application claims priority under 35 U.S.C. §119(a) from Korean Patent Application No. 10-2011-0014738 filed on Feb. 18, 2011, the disclosure of which is hereby incorporated by reference in its entirety.

BACKGROUND

Example embodiments generally relate to a semiconductor chip design, and more particularly, to a system and/or method for analyzing timing of a semiconductor chip.

With the miniaturization of semiconductor technology, process variation may increase and chip yield loss may become an important issue.

Statistical static timing analysis (SSTA) may be used to analyze the impact of process variation on the timing of a chip.

According to the SSTA, the timing of a chip is expressed as probability distribution and a probability that the chip satisfies the given timing requirements, e.g., timing yield is estimated from the probability distribution.

SSTA may use the resistance and capacitance information of a semiconductor chip to analyze the wiring disposition and timing of semiconductor logic cells. SSTA is a process of checking whether the semiconductor chip can operate in a given specification, e.g., 100 MHz.

However, when SSTA is used, it may be difficult to accurately estimate the timing yield unless phenomena occurring in chip is accurately reflected.

Therefore, a timing yield analysis method for accurate estimation of timing yield is desired.

SUMMARY

Example embodiments relate to a method analyzing timing of a semiconductor chip. The method may include defining a netlist, defining time delays of devices defined in the netlist, performing a normality test using the time delays, judging a p-value based on the normality test, and determining a time delay of the semiconductor chip based on the p-value.

The determining the time delay may include determining the time delay of the semiconductor chip using a normal distribution when the p-value is greater than a threshold value.

The threshold value may be 0.05.

The determining the time delay may include determining the time delay of the semiconductor chip using a sampling distribution obtained using the time delays of the devices when the p-value is less than or equal to a threshold value.

The devices defined in the netlist may include cells in the semiconductor chip and connecting nodes between the cells.

The defining the time delays may include defining a time delay of the cells in the semiconductor chip and defining a time delay of the connecting nodes between the cells.

The defining the time delay of the connecting nodes may include extracting resistance and capacitance of the connecting nodes between the cells and defining the time delay of the connecting nodes using the resistance and the capacitance.

The resistance and the capacitance may be extracted using thickness information of the connecting nodes.

The resistance and the capacitance may be extracted using a thickness distribution of the connecting nodes and a width distribution of the connecting nodes.

Example embodiments relate to a timing analysis system for performing a method of analyzing timing of a semiconductor chip. The timing analysis system may include a netlist defining block configured to define a netlist, a time delay defining block configured to define time delays of devices defined in the netlist, and a timing determination block. The timing determination block may be configured to perform a normality test using the time delays, judge a p-value, and determine a time delay of the semiconductor chip based on the p-value.

The timing determination block may determine the time delay of the semiconductor chip using a normal distribution when the p-value is greater than a threshold value.

The timing determination block may determine the time delay of the semiconductor chip using a sampling distribution obtained using the time delays of the devices when the p-value is less than or equal to a threshold value.

The devices defined in the netlist may include cells in the semiconductor chip and connected nodes between the cells. The time delay defining block may include a first time delay decision block configured to define a time delay of the cells in the semiconductor chip and a second time delay decision block configured to define a time delay of the connecting nodes between the cells.

The timing analysis system may further include an RC extraction block configured to extract resistance and capacitance of the connecting nodes between the cells.

The second time delay decision block may define the time delay of the connecting nodes using the resistance and the capacitance extracted by the RC extraction block.

The RC extraction block may include a thickness decision block configured to determine thickness information of the connecting nodes and an RC determination block configured to extract the resistance and the capacitance using the thickness information.

The thickness decision block may be configured to determine width information of the connecting nodes. The RC determination block may be configured to extract the resistance and the capacitance further using the width information.

The RC extraction block may be configured to extract the resistance and the capacitance further using a thickness distribution and a width distribution of the connecting nodes.

According to example embodiments, an apparatus for performing a method of analyzing timing of a semiconductor chips includes a time delay defining block configured to define time delays of devices defined in a netlist, and a time determination block. The time determination block may be configured to judge a p-value of a normality test using the time delays of the devices, and determine a time delay of the semiconductor chip using one of a normal distribution and a sample distribution obtained using the time delays of the devices, based on the relationship of the p-value to a threshold value.

The apparatus may further include a netlist defining block configured to define the netlist, wherein the devices defined in the netlist include at least two cells of a semiconductor chip and at least two routes between the at least two cells.

The apparatus may further include a RC extraction block configured to determine resistance and capacitance of the at least two routes based on at least one of thickness and width information obtained for the at least two routes. The time delay defining block may be configured to define time delays for the at least two routes based on the resistance and capacitance determined by the RC extraction block.

The apparatus may further include a RC extraction block configured to determine resistance and capacitance of the at least two routes based on the thickness information obtained for the at least two routes. The time delay defining block may be configured to define time delays for the at least two routes based on the resistance and capacitance determined by the RC extraction block.

The RC extraction block may include a RC determination block and a thickness decision block. The thickness decision block may be configured to measure a thickness of the at least two route. The RC extraction block may be configured to take the thickness of the at least two routes into account when determining resistance and capacitance of the at least two routes.

BRIEF DESCRIPTION OF THE DRAWINGS

The foregoing and other features and advantages of example embodiments will become more apparent by describing in detail exemplary embodiments thereof with reference to the attached drawings in which.

DETAILED DESCRIPTION OF THE EMBODIMENTS

Figure 1:
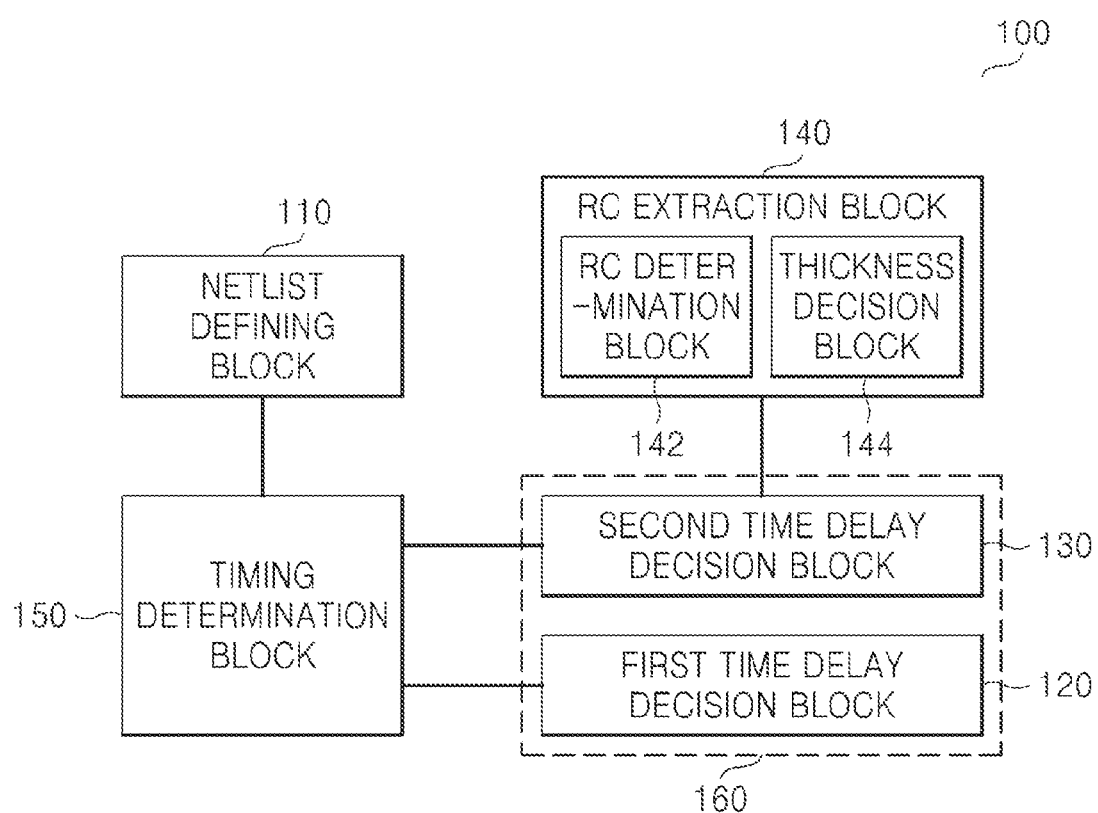
FIG. 1 is a diagram of a timing analysis system for a semiconductor chip according to example embodiments.

Example embodiments now will be described more fully hereinafter with reference to the accompanying drawings, in which some example embodiments are shown. Example embodiments may, however, be embodied in many different forms and should not be construed as limited to the embodiments set forth herein. Rather, these example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Figure 2:
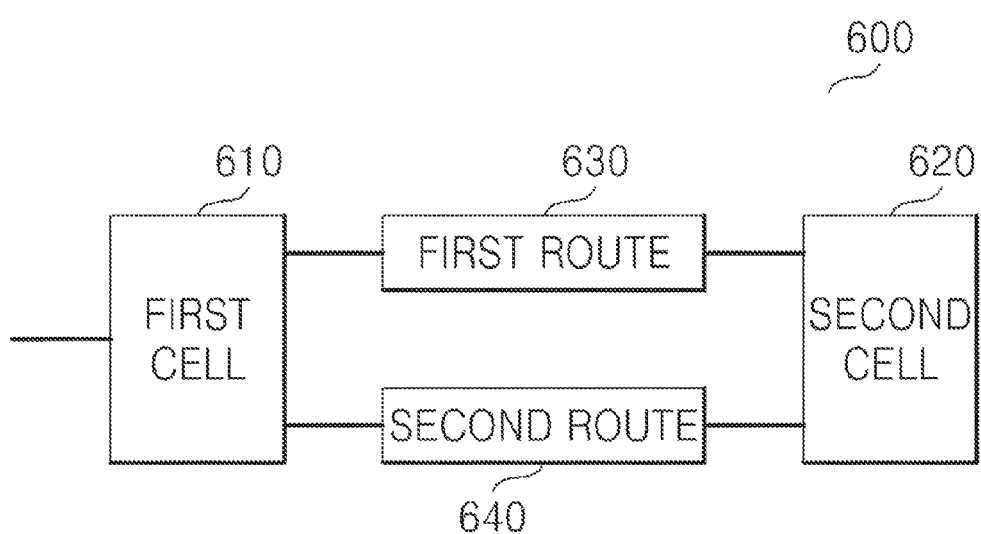
FIG. 2 is a diagram of a circuit in a semiconductor chip according to example embodiments.
Figure 3:
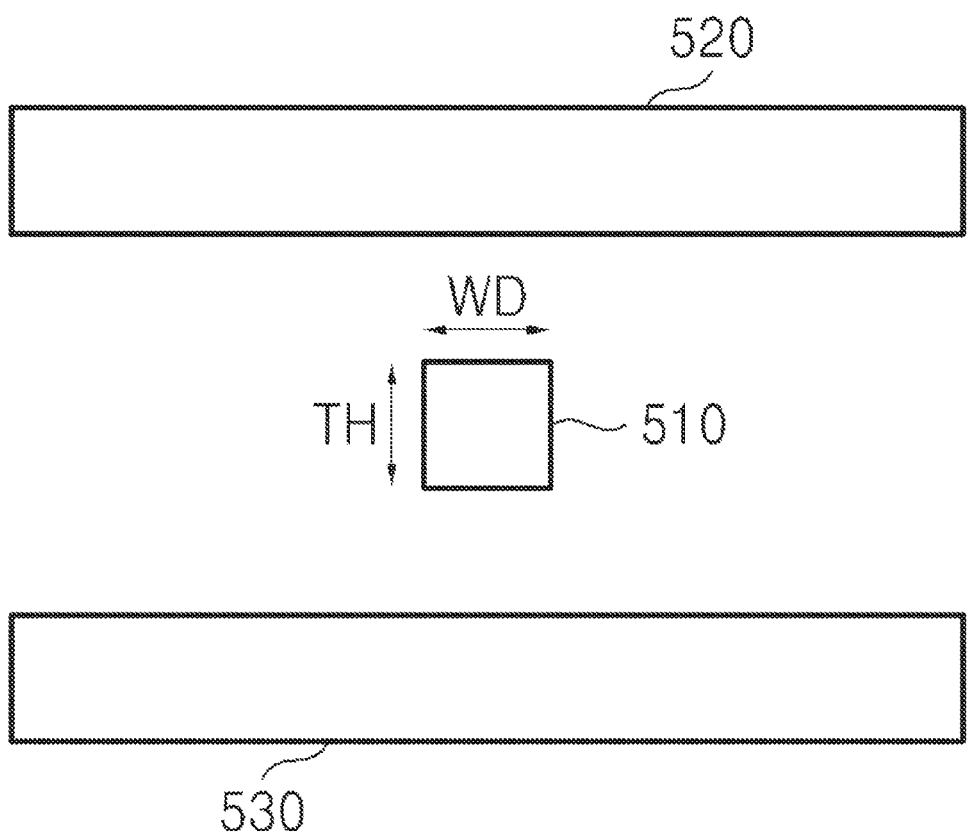
FIG. 3 is a horizontal sectional view of a semiconductor wafer.
Figure 4:
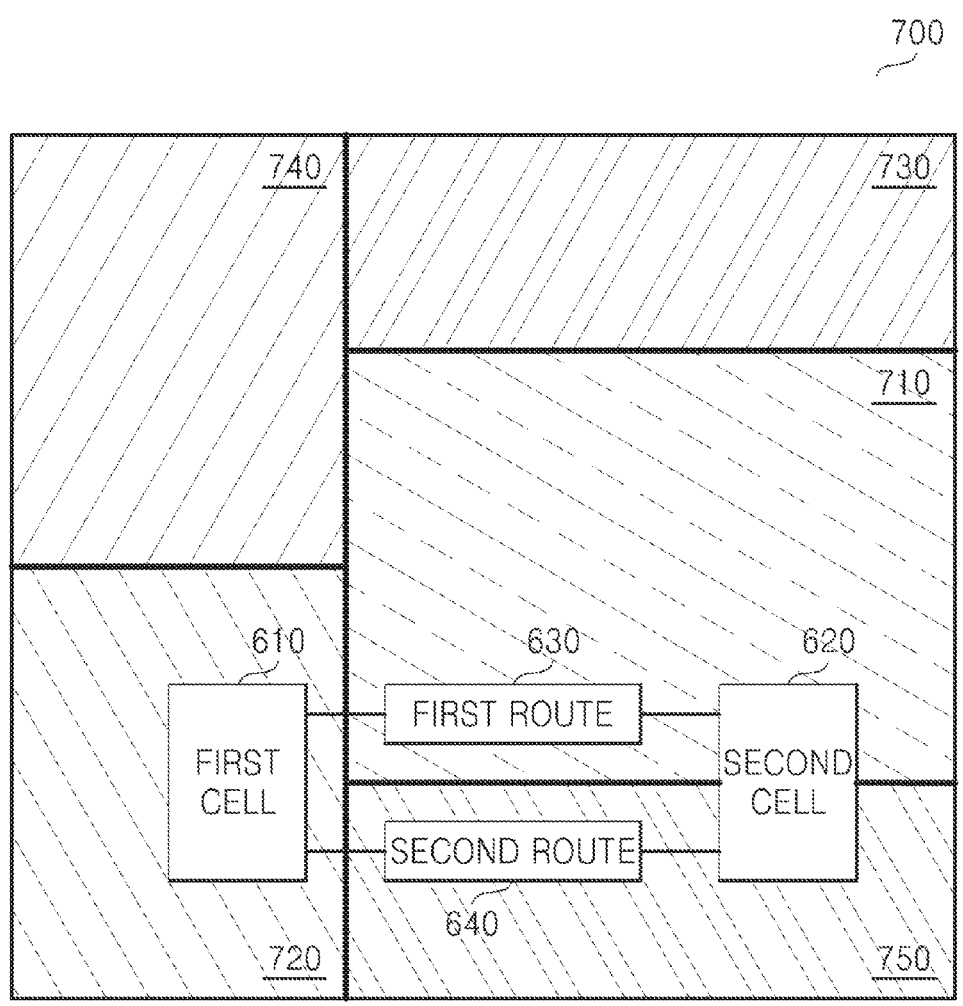
FIG. 4 is a diagram of a semiconductor chip including the circuit illustrated in FIG. 2 according to example embodiments.
Figure 5:
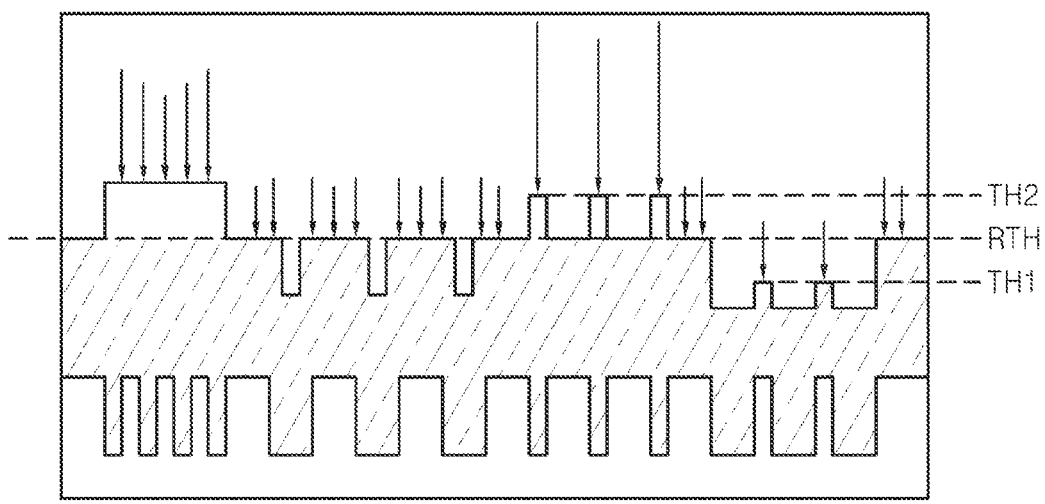
FIG. 5 is a horizontal sectional view of a part of the semiconductor chip illustrated in FIG. 4.
Figure 6:
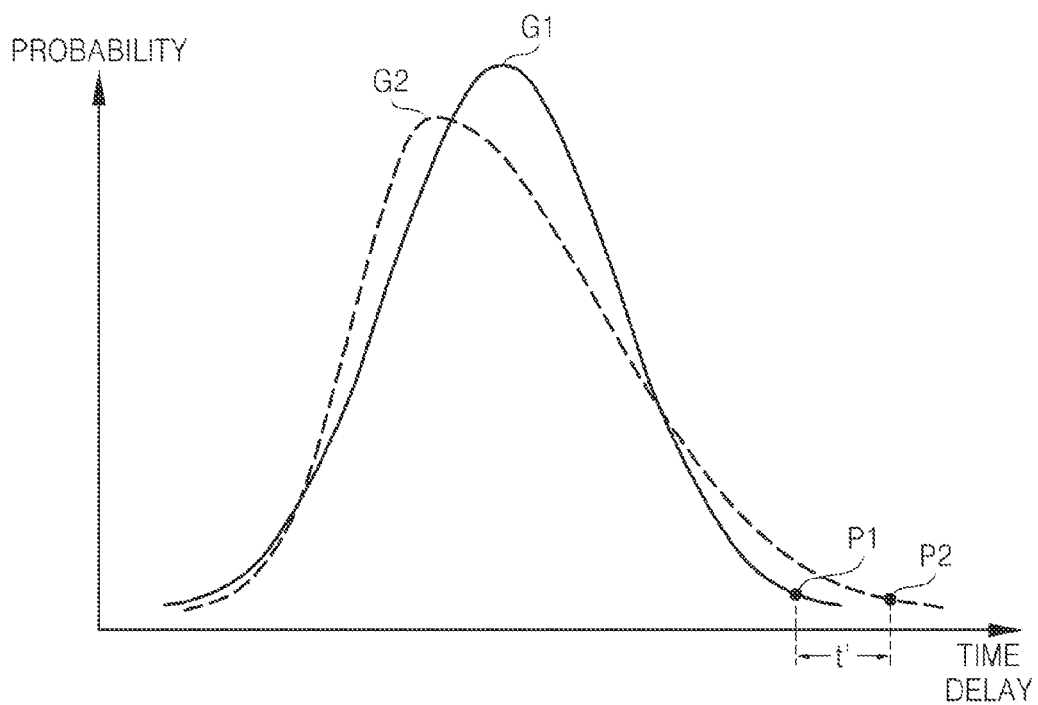
FIG. 6 is a diagram showing a normal distribution and a sampling distribution realized by a timing determination block illustrated in FIG. 1.

FIG. 1 is a diagram of a timing analysis system 100 for a semiconductor chip according to example embodiments. FIG. 2 is a diagram of a circuit 600 in a semiconductor chip according to example embodiments. FIG. 3 is a horizontal sectional view of a semiconductor wafer. FIG. 4 is a diagram of a semiconductor chip 700 including the circuit 600 illustrated in FIG. 2 according to example embodiments. FIG. 5 is a horizontal sectional view of a part of the semiconductor chip 700 illustrated in FIG. 4. FIG. 6 is a diagram showing a normal distribution and a sampling distribution realized by a timing determination block 150 illustrated in FIG. 1.

Referring to FIG. 1, the timing analysis system 100 includes a netlist defining block 110, a time delay defining block 160 including a first time delay decision block 120 and a second time delay decision block 130, an RC extraction block 140, and the timing determination block 150.

The netlist defining block 110 defines a netlist. When the netlist is defined, the types of cells (e.g., transistor elements) in a semiconductor chip and information about connecting nodes between cells may be defined.

For instance, referring to FIG. 2, the circuit 600 in a semiconductor chip may include a first cell 610, a second cell 620, a first route 630, and a second route 640, and the netlist defining block 110 may define the first cell 610, the second cell 620, the first route 630, and the second route 640. While FIG. 2 illustrates the netlist defining block 110 may define a circuit 600 including the first cell 610 and the second cell 620, and the first route 630 and the second route 640, example embodiments are not limited thereto, and the netlist may define more than two cells and/or more than two routes between cells.

The first time delay decision block 120 may define the time delay of cells in a semiconductor chip. For instance, referring to FIG. 2, the first time delay decision block 120 may decide and define the time delay of the first cell 610 and the time delay of the second cell 620.

The second time delay decision block 130 may define the time delay of connecting nodes between cells in a semiconductor chip. For instance, referring to FIG. 2, the second time delay decision block 130 may decide and define the time delay of the first route 630 and the time delay of the second route 640.

The RC extraction block 140 may include an RC determination block 142 and a thickness decision block 144. The second time delay decision block 130 needs to be given the resistance and the capacitance of connecting nodes to define the time delay of the connecting nodes between cells.

Referring to FIG. 3, the semiconductor wafer includes a first metal 510, a second metal 520, and a third metal 530, but example embodiments are not limited thereto. A space among the first metal 510, the second metal 520, and the third metal 530 may be a via. The first metal 510 may include the first route 630 and the second route 640 of the circuit 600 illustrated in FIG. 2.

When the RC extraction block 140 defines the resistance and the capacitance of the first metal 510, the resistance and the capacitance of the first metal 510 may be calculated differently depending on a thickness TH and/or a width WD of the first metal 510. Based on a calculation result, the second time delay decision block 130 may define the time delay.

The RC determination block 142 may determine the resistance and the capacitance of the first metal 510 based on the reference thickness and the thickness distribution of the first metal 510.

However, the semiconductor chip 700 illustrated in FIG. 4 may have different thicknesses in different regions 710, 720, 730, 740, and 750 according to a pattern. The different thicknesses may be measured by the thickness decision block 144. For example, the first region 710 may have a thickness of 0.1 µm, the second region 720 may have a thickness of 0.3 µm, the third region 730 may have a thickness of 0.5 µm, the fourth region 740 may have a thickness of 0.7 µm, and the fifth region 750 may have a thickness of 0.9 µm, although example embodiments are not limited thereto. Consequently, the first route 630 and the second route 640 may have different thicknesses of 0.1 µm and 0.9 µm, respectively, although example embodiments are not limited thereto.

Accordingly, when the RC determination block 142 defines the resistance and the capacitance of the first metal 510 using only the reference thickness and thickness distribution of the first metal 510, an error may occur.

To reduce the error, the RC determination block 142 may newly define the resistance and the capacitance of the first metal 510 with consideration of the thicknesses of the first and second routes 630 and 640 measured by the thickness decision block 144.

For example, when the RC determination block 142 calculates resistance R1 and capacitance C1 of the first metal 510 using the reference thickness and the thickness distribution of the first metal 510, $R1 = R_{ref} + k \times \Delta TH + m \times \Delta WD$ and $C1 = C_{ref} + u \times \Delta TH + v \times \Delta WD$. Here, $R_{ref}$ and $C_{ref}$ may be respectively resistance and capacitance determined by the RC determination block 142 using the reference thickness, $\Delta TH$ is the thickness distribution, $\Delta WD$ is a width distribution, and "k", "m", "u" and "v" are particular values (e.g., sensitivity) obtained by the RC determination block 142 using the thickness distribution and the width distribution.

When the thickness decision block 144 measures the thickness of the first route 630 and the thickness of the second route 640, the RC determination block 142 may substitute the thickness distribution $\Delta TH$ with either of the measured thicknesses, thereby obtaining new resistance and capacitance.

For example, when a reference thickness RTH, a first thickness TH1, and a second thickness TH2 are as shown in FIG. 5, $R_{ref}$ obtained by the RC determination block 142 using the reference thickness RTH is 100, $k \times \Delta TH$ obtained using the thickness distribution $\Delta TH$ is ±30, and $m \times \Delta WD$ obtained using the width distribution $\Delta WD$ is ±20, R1=100±50, although example embodiments are not limited thereto.

However, when the thickness decision block 144 measures the first thickness TH1 of the first route 630 or the second thickness TH2 of the second route 640, $k \times \Delta TH$ obtained by substituting $\Delta TH$ with the first or second thickness TH1 or TH2 is 30, and $m \times \Delta WD$ obtained using the width distribution $\Delta WD$ is ±20, R1=100+30±20=130±20, although example embodiments are not limited thereto.

Consequently, less error occurs when the RC determination block 142 takes the thickness of the first or second routes 630 or 640 into account than when it does not.

In case of capacitance, less error occurs due to the RC determination block 142 through the similar procedure to the case of resistance.

In the above example, the width of the first metal 510 does not change but only the thickness of the first metal 510 changes. However, example embodiments are not limited thereto. According to example embodiment, only the width of the first metal 510 may change, or both the width and thickness of the first metal 510 may change.

The timing determination block 150 may determine a total time delay with consideration of the time delay of cells in a semiconductor chip, which is decided by the first time delay decision block 120, and the time delay of connecting nodes between the cells in the semiconductor chip, which is decided by the second time delay decision block 130.

At this time, the timing determination block 150 may perform a normality test using the time delay of the cells and the time delay of the connecting nodes.

After performing the normality test, the timing determination block 150 may determine time delay using a normal (or Gaussian) distribution when a p-value is greater than a threshold (or alternatively predetermined) value and may determine time delay using a sampling distribution obtained by sampling the time delay of the cells and the time delay of the connecting nodes, which have been decided by the first and second time delay decision blocks 120 and 130, when the p-value is not greater than the threshold (or alternatively predetermined) value (e.g., 0.05, but example embodiments are not limited thereto).

Referring to FIG. 6, a graph G1 is the normal distribution and a graph G2 is the sampling distribution. When the p-value is greater than a threshold (or alternatively predetermined) value (e.g., 0.05, but example embodiments are not limited thereto), the timing determination block 150 may determine a time delay using the normal distribution.

When the timing determination block 150 determines a time delay using the sampling distribution even though the p-value is greater than the threshold (or alternatively predetermined) value (e.g., 0.05, but example embodiments are not limited thereto), an error of a particular time t' may occur. At this time, a first point P1 and a second point P2 may correspond to the median values plus 3 sigma in the graphs G1 and G2, respectively.

Figure 7:
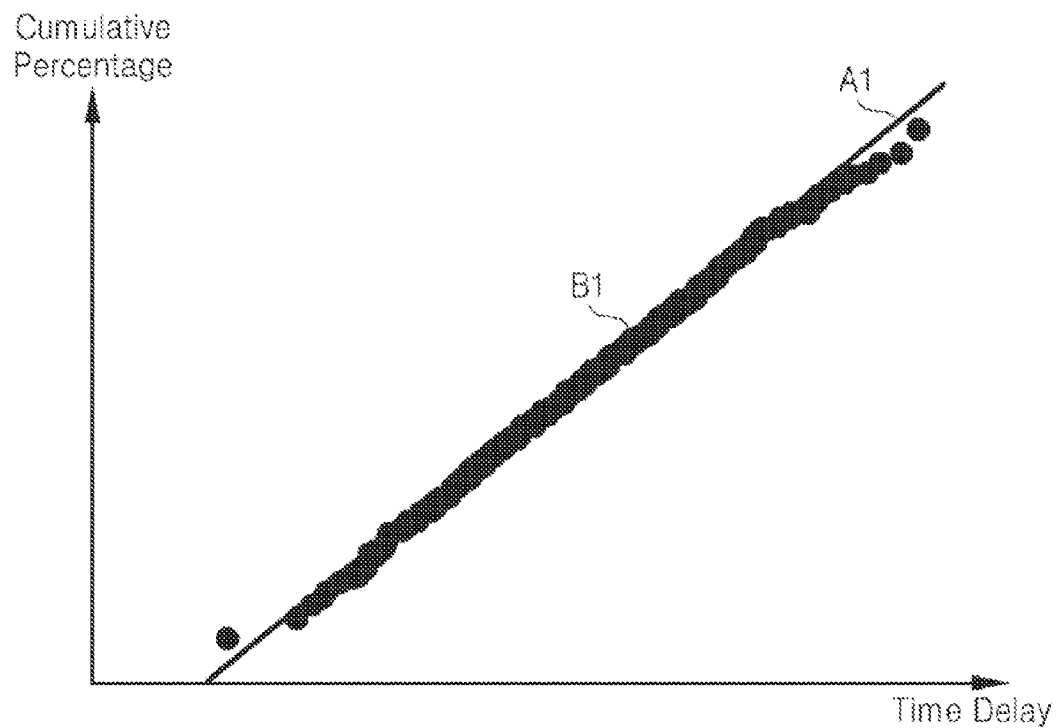
FIGS. 7 and 8 are graphs of time delay versus percentage of cells and connecting nodes in a semiconductor chip with respect to a p-value.
Figure 8:
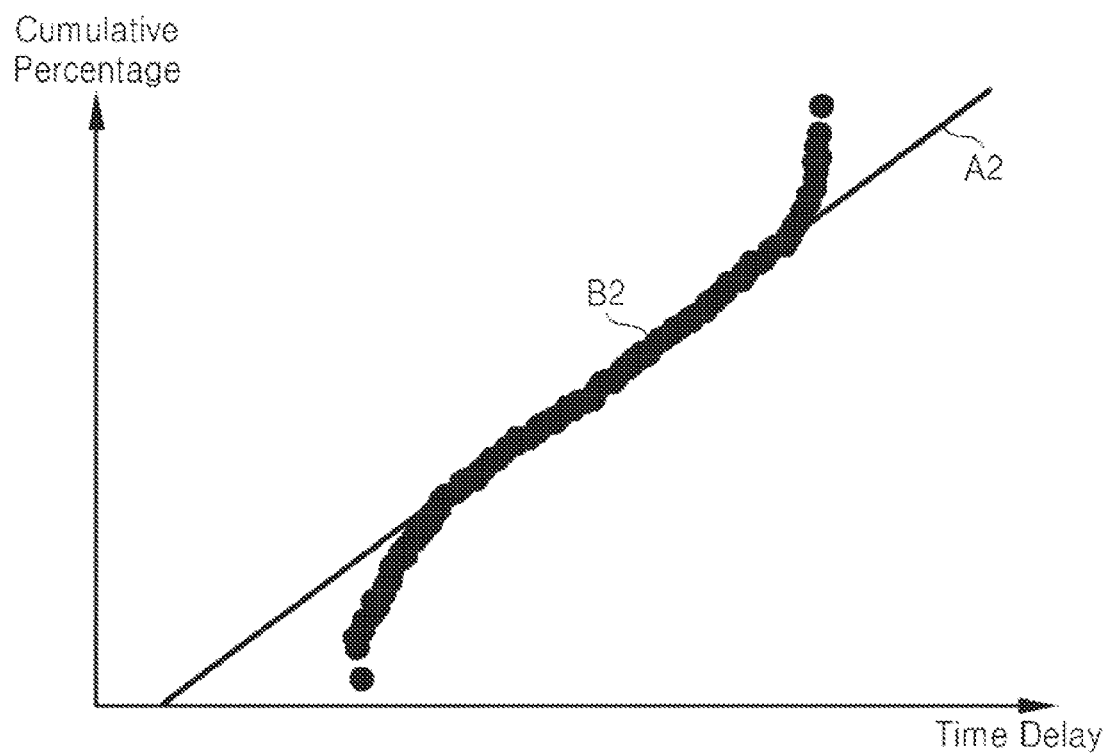

FIGS. 7 and 8 are graphs of time delay versus percentage of cells and connecting nodes in a semiconductor chip with respect to a p-value. FIGS. 7 and 8 refer to time delay based on the normal distribution.

FIG. 7 is a graph illustrating the relationship between time delay occurring when the p-value is greater than the threshold (or alternatively predetermined) value (e.g., 0.05, but example embodiments are not limited thereto) and the percentage of cells and connecting nodes in a semiconductor chip.

As the time delay increases, the cumulative percentage of samples B1 of the cells and the connecting nodes in the semiconductor chip also increases. The samples B1 have almost the same distribution as a straight line A1 having the least error in time delay.

FIG. 8 is a graph illustrating the relationship between time delay occurring when the p-value is not greater than the threshold (or alternatively predetermined) value (e.g., 0.05, but example embodiments are not limited thereto) and the percentage of cells and connecting nodes in a semiconductor chip.

As the time delay increases, the cumulative percentage of samples B2 of the cells and the connecting nodes in the semiconductor chip also increases. The samples B2 have a distribution which agrees less with a straight line A2 having the least error in time delay than the distribution that the samples B1 have in FIG. 7.

Accordingly, the timing determination block 150 takes the normal distribution when the p-value is greater than the threshold (or alternatively predetermined) value (e.g., 0.05, but example embodiments are not limited thereto) as illustrated in FIG. 7 and takes the sampling distribution when the p-value is not greater than the threshold (or alternatively predetermined) value (e.g., 0.05, but example embodiments are not limited thereto) as illustrated in FIG. 8, thereby reducing an error in the time delay.

Figure 9:
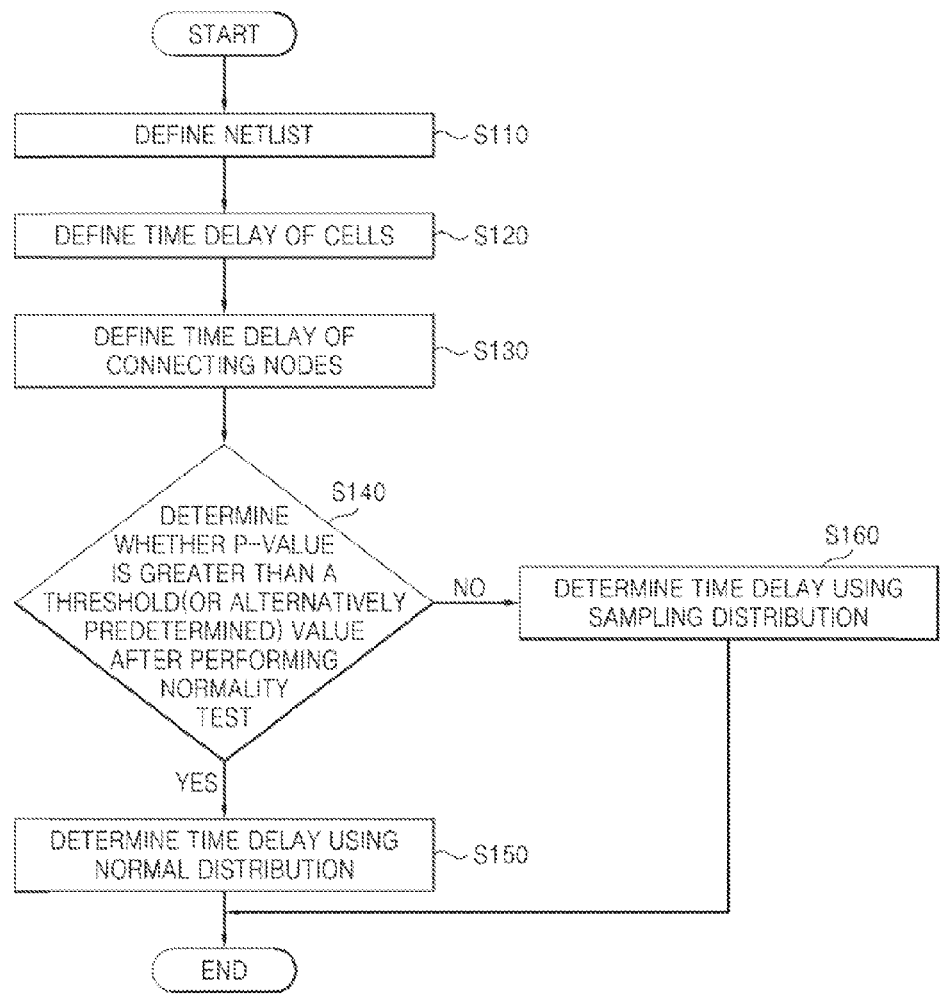
FIG. 9 is a flowchart of a method of analyzing timing of a semiconductor chip according to example embodiments.

FIG. 9 is a flowchart of a method of analyzing timing of a semiconductor chip according to example embodiments. The method may be performed by the timing analysis system 100 illustrated in FIG. 1 or any system executing software in which the method is programmed.

Referring to FIGS. 1 and 9, the netlist defining block 110 defines a netlist in operation S110. At this time, when the netlist is defined, types of cells (e.g., transistor elements) in a semiconductor chip and information about connecting nodes between cells may be defined.

The first time delay decision block 120 may define a time delay of the cells in the semiconductor chip in operation S120.

The second time delay decision block 130 may define a time delay of connecting nodes between the cells in the semiconductor chip in operation S130. The time delay defined by the second time delay decision block 130 will be described in detail with reference to FIG. 10 later.

The timing determination block 150 may perform a normality test using the time delay received from the first time delay decision block 120 and the time delay received from the second time delay decision block 130 and may determine whether a p-value is greater than a threshold (or alternatively predetermined) value in operation S140. At this time, the time delays may include the time delay of the cells in the semiconductor chip and the time delay of the connecting nodes between the cells in the semiconductor chip.

When it is determined that the p-value is greater than the threshold (or alternatively predetermined) value, the timing determination block 150 may determine a time delay using a normal (or Gaussian) distribution in operation S150.

When it is determined that the p-value is greater than the threshold (or alternatively predetermined) value (e.g., 0.05, but example embodiments are not limited thereto), the timing determination block 150 may determine a time delay using a sampling distribution obtained by sampling the time delay of the cells and the time delay of the connecting nodes, which have been received from the first time delay decision block 120 and the second time delay decision block 130, in operation S160.

Figure 10:
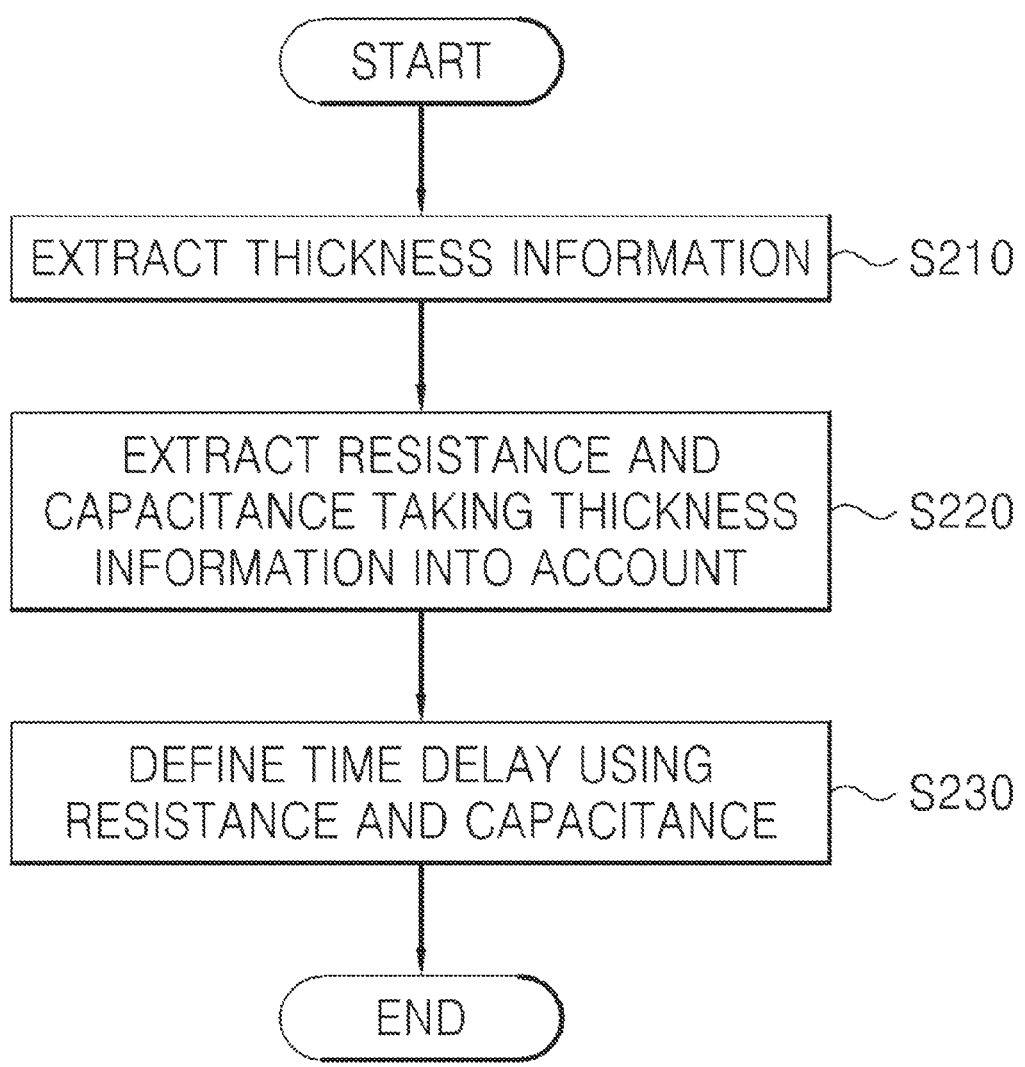
FIG. 10 is a detailed flowchart of the operation of defining time delay of connecting nodes in the method illustrated in FIG. 9.

FIG. 10 is a detailed flowchart of defining the time delay of the connecting nodes in operation S130 illustrated in FIG. 9. Referring to FIG. 10, the thickness decision block 144 may extract thickness information of a semiconductor layer in operation S210.

The RC determination block 142 may extract resistance and capacitance of the connecting nodes between the cells, taking the thickness information into account in operation S220. For instance, the RC determination block 142 may extract the resistance and the capacitance of the connecting nodes between the cells, taking the thickness information of the connecting nodes into account.

The RC determination block 142 may also use the width information, thickness distribution and width distribution of the connecting nodes when extracting the resistance and the capacitance.

The second time delay decision block 130 may define time delay using the resistance and the capacitance in operation S230.

Example embodiments of inventive concepts can be embodied as hardware, software, or combinations of hardware and software. Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

As described above, according to example embodiments, accurate estimation of timing yield is enhanced. If the chip yield loss is predictable according to a result of the timing yield analysis method, the design of the semiconductor chip may be altered. While some example embodiments have been particularly shown and described, it will be understood by one of ordinary skill in the art that variations in form and detail may be made therein without departing from the spirit and scope of the claims.

What is claimed is:

1. A method of analyzing timing of a semiconductor chip, the method comprising:
defining a netlist;
defining time delays of devices defined in the netlist;
performing a normality test using the time delays;

judging a p-value based on the normality test; and
determining a time delay of the semiconductor chip based on the p-value.

2. The method of claim 1, wherein the determining a time delay comprises:
determining the time delay of the semiconductor chip using a normal distribution when the p-value is greater than a threshold value.

3. The method of claim 2, wherein the threshold value is 0.05.

4. The method of claim 1, wherein the determining a time delay comprises:
determining the time delay of the semiconductor chip using a sampling distribution obtained using the time delays of the devices when the p-value is less than or equal to a threshold value.

5. The method of claim 1, wherein
the devices defined in the netlist include cells in the semiconductor chip and connecting nodes between the cells, and
the defining time delays of devices defined in the netlist comprises,
defining a time delay of the cells in the semiconductor chip; and
defining a time delay of the connecting nodes between the cells.

6. The method of claim 5, wherein the defining a time delay of the connecting nodes comprises:
extracting resistance and capacitance of the connecting nodes between the cells, and
defining the time delay of the connecting nodes using the resistance and the capacitance.

7. The method of claim 6, wherein the resistance and the capacitance are extracted using thickness information of the connecting nodes.

8. The method of claim 6, wherein the resistance and the capacitance are extracted using a thickness distribution of the connecting nodes and a width distribution of the connecting nodes.

9. A timing analysis system for performing a method of analyzing timing of a semiconductor chip, the timing analysis system comprising:
a netlist defining block configured to define a netlist;
a time delay defining block configured to define time delays of devices defined in the netlist; and
a timing determination block configured to,
perform a normality test using the time delays,
judge a p-value, and
determine a time delay of the semiconductor chip based on the p-value.

10. The timing analysis system of claim 9, wherein the timing determination block is configured to determine the time delay of the semiconductor chip using a normal distribution when the p-value is greater than a threshold value.

11. The timing analysis system of claim 9, wherein the timing determination block is configured to determine the time delay of the semiconductor chip using a sampling distribution obtained using the time delays of the devices when the p-value is less than a threshold value.

12. The timing analysis system of claim 9, wherein the devices defined in the netlist comprise cells in the semiconductor chip and connecting nodes between the cells, and
the time delay defining block comprises,
a first time delay decision block configured to define a time delay of the cells in the semiconductor chip; and
a second time delay decision block configured to define a time delay of the connecting nodes between the cells.

13. The timing analysis system of claim 12, further comprising:
an RC extraction block configured to extract resistance and capacitance of the connecting nodes between the cells,
wherein the second time delay decision block is configured to define the time delay of the connecting nodes using the resistance and the capacitance extracted by the RC extraction block.

14. The timing analysis system of claim 13, wherein the RC extraction block comprises:
a thickness decision block configured to determine thickness information of the connecting nodes; and
an RC determination block configured to extract the resistance and the capacitance using the thickness information.

15. The timing analysis system of claim 14, wherein
the thickness decision block is configured to determine width information of the connecting nodes.

16. An apparatus for performing a method of analyzing timing of a semiconductor chip, the apparatus comprising:
a time delay defining block configured to define time delays of devices defined in a netlist; and
a timing determination block configured to,
judge a p-value of a normality test using the time delays of the devices,
determine a time delay of the semiconductor chip using one of a normal distribution and a sample distribution obtained using the time delays of the devices, based on the relationship of the p-value to a threshold value.

17. The apparatus of claim 16, further comprising:
a netlist defining block configured to define the netlist,
wherein the devices defined in the netlist include at least two cells of a semiconductor chip and at least two routes between the at least two cells.

18. The apparatus of claim 17, further comprising:
a RC extraction block configured to determine resistance and capacitance of the at least two routes based on at least one of thickness and width information obtained for the at least two routes,
wherein the time delay defining block is configured to define time delays for the at least two routes based on the resistance and capacitance determined by the RC extraction block.

19. The apparatus of claim 17, further comprising:
a RC extraction block configured to determine resistance and capacitance of the at least two routes based on thickness information obtained for the at least two routes,
wherein the time delay defining block is configured to define time delays for the at least two routes based on the resistance and capacitance determined by the RC extraction block.

20. The apparatus of claim 19, wherein
the RC extraction block includes a RC determination block and a thickness decision block,
the thickness decision block is configured to measure a thickness of the at least two routes, and
the RC determination block is configured to take the thickness of the at least two routes into account when determining resistance and capacitance of the at least two routes.

* * * * *